United States Patent
Maringer et al.

(10) Patent No.: US 7,802,385 B2
(45) Date of Patent: Sep. 28, 2010

(54) INLAY CARDS AND METHOD FOR ITS MANUFACTURE

(75) Inventors: Adolf Maringer, Salzburg (AT); Karl Kronegger, Ebensee (AT); Michael Grossinger, Kosendorf (AT)

(73) Assignee: Sony DADC Austria AG, Anif (AT)

( * ) Notice: Subject to any disclaimer, the term of this patent is extended or adjusted under 35 U.S.C. 154(b) by 248 days.

(21) Appl. No.: 11/360,480

(22) Filed: Feb. 24, 2006

(65) Prior Publication Data

US 2006/0207130 A1  Sep. 21, 2006

(30) Foreign Application Priority Data

Feb. 24, 2005  (EP)  .................................. 05004013

(51) Int. Cl.
    *G09F 1/00*  (2006.01)
(52) U.S. Cl. .............. 40/124.01; 40/124.09; 40/124.16; 40/124.06
(58) Field of Classification Search ............. 40/124.01, 40/124.09; 206/307, 308.1
    See application file for complete search history.

(56) References Cited

U.S. PATENT DOCUMENTS

| | | | | |
|---|---|---|---|---|
| 3,847,077 A | * | 11/1974 | Zirnstein et al. ............... | 101/24 |
| 4,205,775 A | * | 6/1980 | Swan .......................... | 229/104 |
| 4,826,211 A | * | 5/1989 | Sinnott et al. ................ | 283/117 |
| 5,011,010 A | * | 4/1991 | Francis et al. ................ | 206/307 |
| 5,789,051 A | * | 8/1998 | Tracy .......................... | 428/43 |
| 6,155,026 A | | 12/2000 | Tracy | |
| 6,409,014 B1 | * | 6/2002 | Hummell et al. ......... | 206/308.1 |
| 6,673,408 B1 | * | 1/2004 | Roth .......................... | 428/40.1 |
| 7,011,249 B2 | * | 3/2006 | Tang ........................... | 235/486 |
| 2003/0038050 A1 | | 2/2003 | McKean | |
| 2003/0094388 A1 | | 5/2003 | Roberts et al. | |
| 2003/0173239 A1 | | 9/2003 | Kepler | |
| 2004/0050720 A1 | * | 3/2004 | Harris ........................ | 206/6.1 |
| 2004/0118716 A1 | | 6/2004 | Watson et al. | |
| 2005/0284779 A1 | * | 12/2005 | Cooper ..................... | 206/308.1 |

FOREIGN PATENT DOCUMENTS

| | | |
|---|---|---|
| JP | 9-30581 | 2/1997 |
| JP | 10-139084 | 5/1998 |
| JP | 2002-347870 | 12/2002 |
| JP | 2003-226390 | 8/2003 |
| WO | WO 02/01563 A1 | 1/2002 |
| WO | WO 03/008185 | 1/2003 |
| WO | WO 2004/012945 A2 | 2/2004 |

\* cited by examiner

*Primary Examiner*—Lesley Morris
*Assistant Examiner*—Christopher E Veraa
(74) *Attorney, Agent, or Firm*—Oblon, Spivak, McClelland, Maier & Neustadt, L.L.P.

(57) ABSTRACT

The invention relates to an inlay card for decorating an enclosure, to packaging for a disk-shaped medium, to a method for manufacturing an inlay card for decorating an enclosure as well as to a method for packaging a disk-shaped medium. In particular, the present invention relates to inlay cards for decorating an enclosure, especially a jewel case, having a curved and/or multifaceted side wall.

The invention can be summarized as an inlay card, or a manufacture thereof, having two or more tabs that are configured and adapted to be bent with respect to a major surface of said inlay card such that the tabs conform to the shape of a multifaceted or curved wall of a jewel case when the inlay card is placed therein.

21 Claims, 4 Drawing Sheets

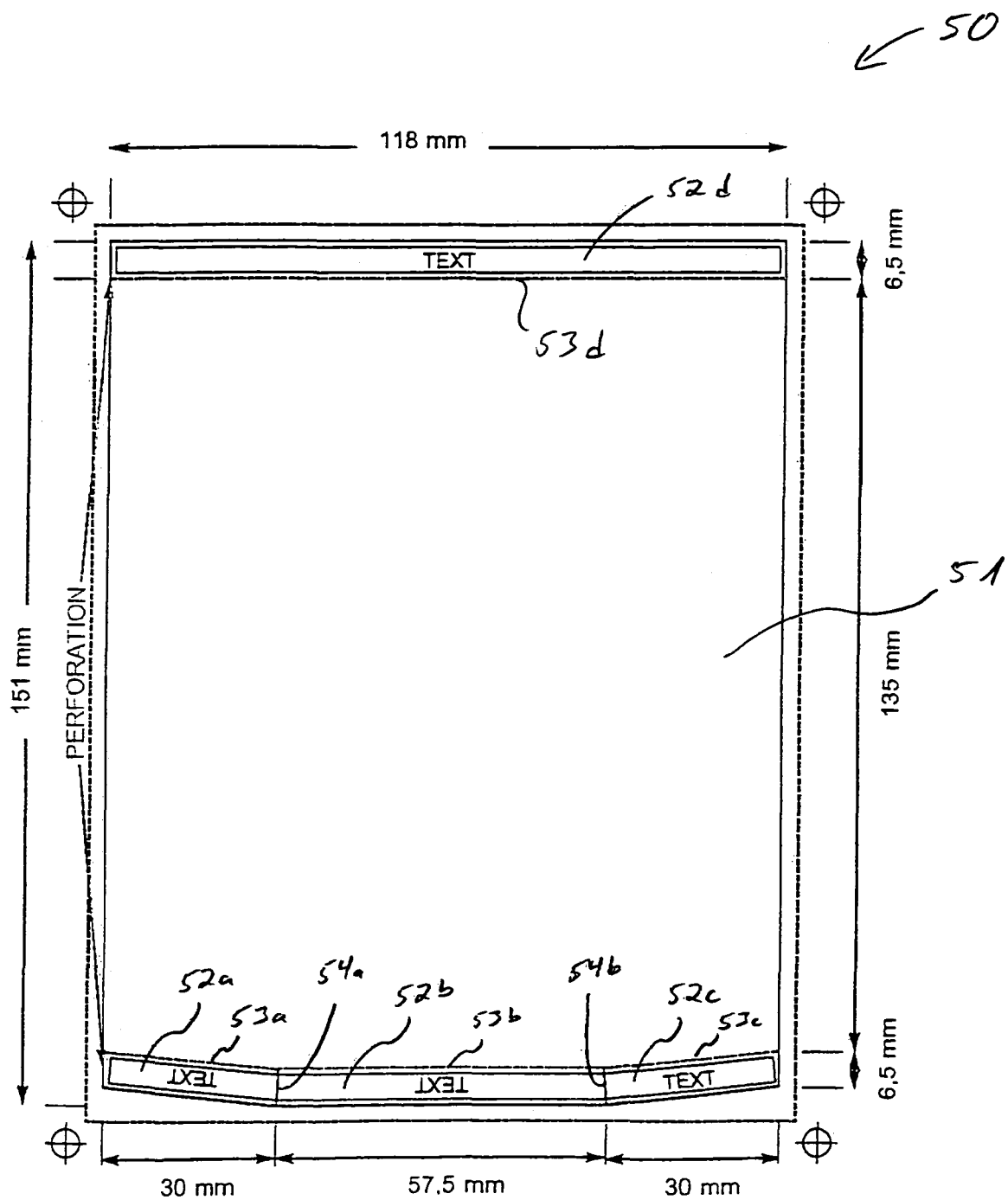

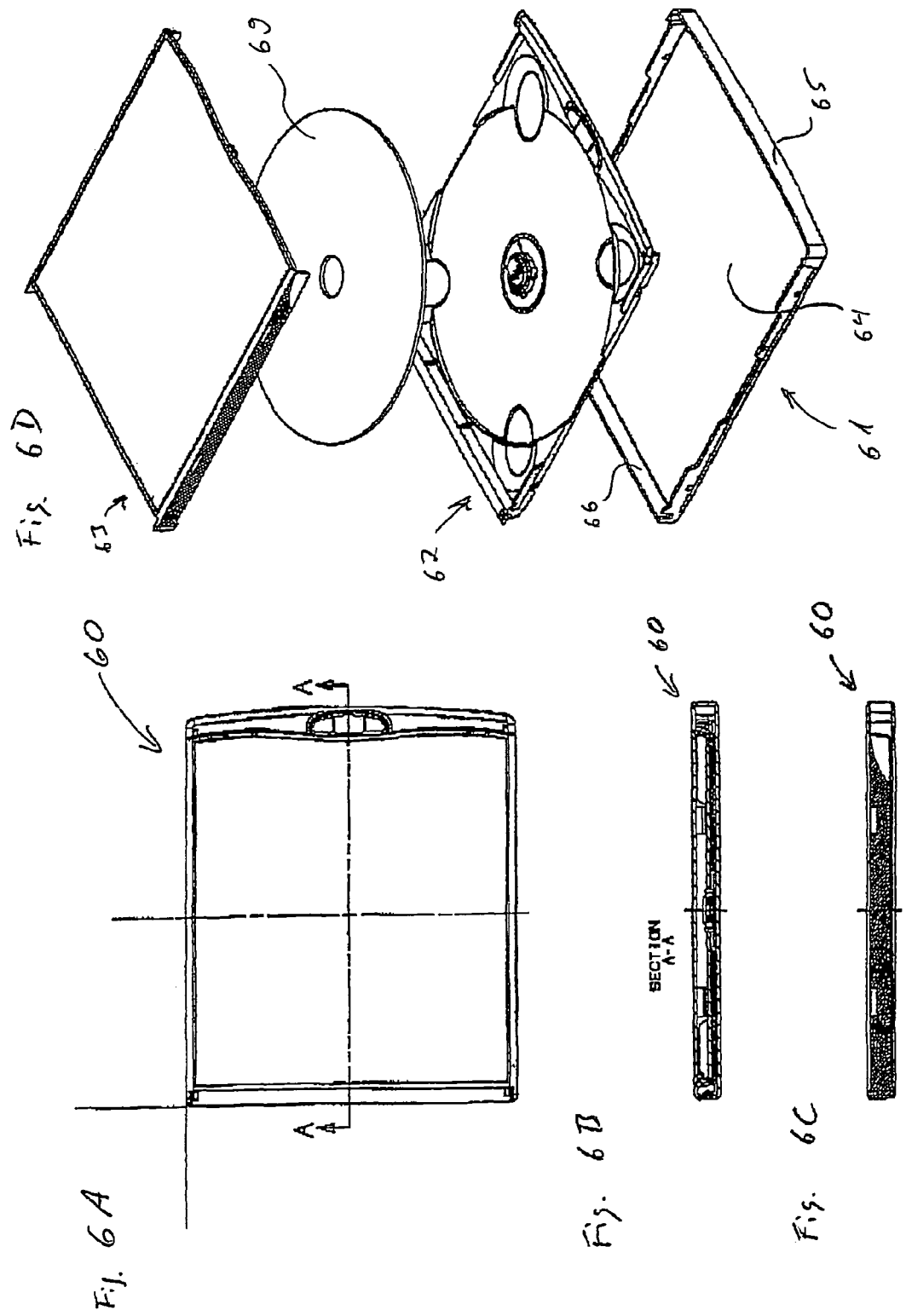

INLAY CARDS AND METHOD FOR ITS MANUFACTURE

BACKGROUND OF THE INVENTION

1. Field of the Invention

The present invention relates to an inlay card for decorating an enclosure, to packaging for a disk-shaped medium, to a method for manufacturing an inlay card for decorating an enclosure as well as to a method for packaging a disk-shaped medium. In particular, the present invention relates to inlay cards for decorating an enclosure, especially a jewel case, having a curved and/or multifaceted side wall.

2. Description of the Related Prior Art

It is well known to package disk-shaped media such as CDs and DVDs in so-called jewel boxes or jewel cases. A particular advantage associated with jewel cases is that the so-packaged media can then be stacked or shelved in an orderly manner analogous to the storage of books. Indeed, jewel cases are typically provided with an inlay card having text and/or images printed thereon that can be viewed via a transparent side wall of the jewel case, even when numerous jewel cases are abuttingly stacked or shelved.

The above aspect of jewel case packaging of disk-shaped media constitutes a significant aspect in its popularity with both retailers and consumers. Were it not for this ability of jewel cases to present information along a side face thereof, similar to the presentation of information on the spine of a book, they could not be stacked or shelved in such a space-saving manner without significantly inconveniencing a person desiring to e.g. make a selection from or peruse through a plurality of media. Slender-styled jewel cases are inconvenient to the user in this respect, i.e. in their presentation of information, when stacked or shelved, and have consequently been ill-received by the market.

To improve customer appeal, jewel cases having roughly the outer dimensions of a standard jewel case, yet with a curved side face, are under development. These have a unique aesthetic appeal that can be further improved upon via employment of novel mechanisms for opening the jewel case and/or for releasing the disk-shaped medium therefrom. If such jewel cases are to enjoy commercial success, it is essential that these be able to present information when stacked or shelved at a level of quality that retailers and consumers have come to expect.

To meet this demand with regard to jewel cases having a curved side face, an inlay card 10 as depicted in FIG. 1 was developed. Inlay card 10 is similar to conventional inlay cards in that it comprises a major surface 11 as well as a minor surface 12 and a minor surface 13, the latter two of which can be bent with respect to the major surface 11 so as to be perpendicular thereto. In this respect, the inlay card 10 is configured and adapted to be received by a jewel case such that the major surface 11 is received by a major surface of the jewel case, e.g. the "back" of the jewel case typically situated opposite a hinged, booklet-carrying door thereof when closed, and such that the minor surfaces 12 and 13 are received by respective side faces of the jewel case, e.g. the respective "ends" of the jewel case, at least one of which is typically visible when numerous jewel cases are abuttingly shelved.

To account for the curvature of the curved side face of the jewel case, two wedge-shaped sections 14a and 14b are removed from the inlay card 10 such that minor surface 13 is nearly entirely disjoint from major surface 11, i.e. such that only a narrow section 15 of card connects minor surface 13 to major surface 11. Although this approach is aesthetically appealing and promotes readability in that it allows minor surface 13 to fully conform to the curved side face of the jewel case without incurring a warping or creasing of the inlay card 10, it is not without drawbacks.

A particular disadvantage of the aforementioned approach is that the slender tips 16 of the wedge-shaped sections 14a, 14b adjacent to the narrow section 15 of card connecting minor surface 13 to major surface 11 cannot be reliably removed by machine and consequently require that the wedge-shaped sections 14a, 14b be removed manually. It is, in fact, even difficult to cleanly punch out wedge-shaped sections 14a, 14b.

In addition to the aforementioned difficulties, the peculiar and fragile design of inlay card 10 of FIG. 1 makes it highly ill-suited for automated assembly into jewel cases using conventional inlay card processing machines. Indeed, tests with regard to the assembly of such inlay cards into jewel cases using conventional inlay card processing machines failed to yield a reliable process. Even comprehensive tests employing alternative/supplementary techniques such as forced air, vacuum bores as well as other mechanical processing of the inlay cards repeatedly resulted in an unacceptably high percentage of torn or creased inlay cards. Fully automated manufacture and assembly of jewel cases and their respective inlay cards, however, is likewise essential for their commercial success.

In view of the above, it is an object of the present invention to provide an inlay card that can be automatically assembled into a jewel case having a curved and/or multifaceted face, preferably using conventional inlay card processing machines.

It is an object of the present invention to provide an inlay card for decorating a jewel case having a transparent or translucent, curved and/or multifaceted side face such that the aesthetic appeal and/or readability of information provided by said inlay card via said curved/multifaceted side face matches, is essentially indiscernible from or exceeds the level of quality expected by retailers and consumers on account of their experience with conventional jewel cases.

It is an object of the present invention to provide an inlay card for decorating a jewel case having a curved and/or multifaceted side face, wherein the design of the inlay card is suitable for automated manufacture.

It is an object of the present invention to provide packaging for a disk-shaped medium employing such a jewel case and such an inlay card.

It is an object of the present invention to provide a method for manufacturing such an inlay card or for providing such packaging.

SUMMARY OF THE INVENTION

To achieve the aforementioned objects, the present invention preferably provides an inlay card in accordance with independent claim 1, packaging in accordance with claim 8 as well as a method of manufacturing an inlay card in accordance with independent claim 9 and a method of packaging in accordance with claim 19. Preferred embodiments of the invention are reflected in the dependent claims.

The invention can be summarized as an inlay card, or a manufacture thereof, having two or more tabs that are configured and adapted to be bent with respect to a major surface of said inlay card such that the tabs conform to the shape of a multifaceted or curved wall of a jewel case when the inlay card is placed therein. In the case of a curved wall, the tabs conform to the curved wall, e.g. as chords of the curve or in the sense of a linear approximation to the curve.

Alternative embodiments of the invention, including broader aspects thereof, are described in detail hereinbelow.

An advantage of this approach is that the entire surface of the inlay card that faces the curved and/or multifaceted wall of the jewel case remains printable. Moreover, the "emulation" of an inlay card having a curved surface is perceived as latter.

BRIEF DESCRIPTION OF THE DRAWINGS

The novel features of the invention, as well as the invention itself, both as to its structure and its operation will be best understood from the accompanying figures, taken in conjunction with the accompanying description. The Figures show:

FIG. 5 a second inlay in accordance with the invention;

FIG. 6A a top view of a dual disc jewel case for use with an inlay card in accordance with the invention;

FIG. 6B a cross-section of the dual disc jewel case of FIG. 6A;

FIG. 6C a side view of the dual disc jewel case of FIG. 6A; and

FIG. 6D an exploded view of the dual disc jewel case of FIG. 6A together with a disc.

DESCRIPTION OF THE PREFERRED EMBODIMENTS

Figure 1:
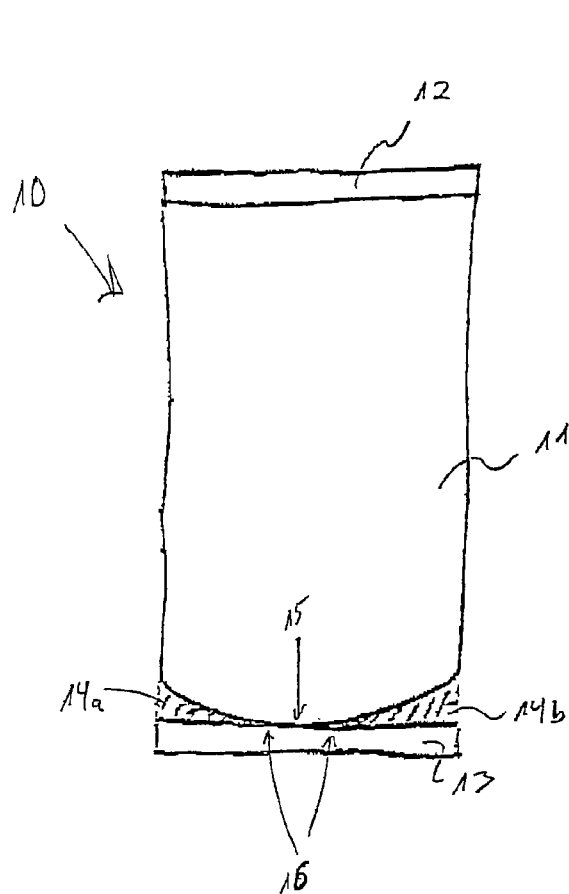
FIG. 1 a conventional inlay card

In its broadest aspect, the invention can be seen in an inlay card for decorating an enclosure, in particular an enclosure having a curved and/or multifaceted wall or side face.

The invention can likewise be seen in a corresponding method. While the present description may, for the sake of brevity, limit itself to a description of the inlay card of the invention, the teachings of this specification are to be understood as applying equally to a corresponding method capable of producing the described inlay card or capable of effecting the functionality of the described inlay card.

Throughout the specification, the expression "inlay card" is preferably to be understood in the conventional sense. It can moreover be understood in the general sense of an element formed from one or more pieces of card-like material, e.g. of paper, plastic sheet, metallic foil or cardboard, in particular paper having a weight of or on the order of 120 to 220, preferably 150 to 190, preferably 170, grams per square meter or of plastic sheet of a similar thickness, flexibility or durability.

Therefore, it will be appreciated that the inlay card may be formed from any web or sheet-like structure. Any aesthetic or structural effects may be applied to the inlay card. For example, the inlay card may have an array of holes punched within it, or dimples may be applied to its surface. The rigidity or flexibility of the inlay card may be homogeneous or inhomogeneous.

Throughout the specification, the expression "enclosure" is to be understood in the sense of something that encloses, e.g. in the sense of packaging, a package, a box, a container or the like. Preferably, the enclosure is a jewel case.

To allow information presented on the inlay card to be perceived through the enclosure, latter is preferably composed of a transparent or translucent material, e.g. a transparent or translucent plastic. Naturally, the enclosure may be composed of one or more other opaque materials such as paper, cardboard, metal, opaque plastic or wood or may be composed of a mixture of opaque, transparent or translucent materials.

The inlay card of the present invention is preferably configured and adapted for decorating an enclosure having an enclosure major surface and at least one wall intersecting said enclosure major surface along an intersection curve. Throughout this specification, the expression "curved wall" will often be used as a short notation for such a wall. Such enclosures include jewel cases having a curved side face as said wall. In this case, the intersection curve can correspond to the intersection between a curved side face of the jewel case and a major surface thereof.

Throughout this specification, the expression "side face" is preferably to be understood as designating the "end" of a jewel case that is conventionally visible when numerous jewel cases are abuttingly shelved. Accordingly, in the context of a jewel case, the expression "major surface" is preferably to be understood as designating the "back" of the jewel case conventionally situated opposite a hinged, booklet-carrying door thereof when closed, i.e. the face of the jewel case that, when shelved with the hinge to the front and with the inlay's text in the appropriate, country-specific orientation, conventionally abuts the left-neighboring jewel case.

The inventors of the present invention recognize, however, that the inlay card of the present invention is not only applicable to jewel cases, but also to other enclosures having a similar generic shape, but not necessarily similar dimensions. Accordingly, although the expressions 'major' and 'minor' are preferably indicative of relative size or area, the present invention is certainly applicable to enclosures whose dimensions do not obey this preferred relationship.

Preferably, the curved and/or multifaceted walls of the enclosure as well as the enclosure major surface are sheet-like in form. Preferably, the curved and/or multifaceted walls or even all walls intersecting the enclosure major surface are perpendicular thereto. The enclosure preferably has the shape of a rectangular parallelepiped excepting the curved or multifaceted wall.

Throughout the specification, the expression "for decorating" can be understood in the sense of "for assembly into or onto," in particular in the sense of "for assembly into or onto . . . with the aim of altering the appearance thereof."

Figure 2:
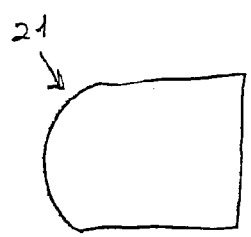
FIG. 2 a cross-sectional view of curved side faces of an enclosure in accordance with the invention.
Figure 2:
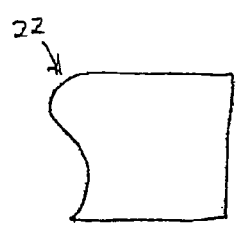
Figure 2:
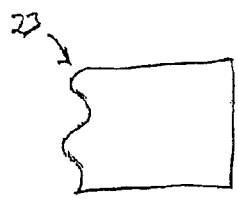

Throughout the specification, the term "multifaceted" is to be understood in the etymological or dictionary sense of the word; the terms "line," "linear," etc. solely designate straight lines; and the terms "curve," "curved," etc. solely designate curves with at least one region having a radius less than infinity, in particular curves whose curvature is readily perceptible, preferably as an aesthetic element of e.g. the enclosure. Preferably, the radius of the curve is on the order of the length thereof or less. For example, the radius of curvature of a curved element is preferably less than 150%, 125%, 100%, 80%, 60%, 40% or 20% of the length of the element as measured e.g. along the curvature or between end points thereof. In the case of a round enclosure, for instance, the radius of curvature of the curved element is $1/(2\pi)$, i.e. roughly 16%, of the circumference of the curved element. The radius of curvature is greater than zero (multifaceted embodiments are dealt with separately) and preferably lies in a range between any two of the aforementioned percentage values. Accordingly, as exemplified by curved, left side faces 21, 22 and 23 of the generally rectangular enclosures shown in the cross-sectional view of FIG. 2, respectively, e.g. C-shaped curves, S-shaped curves and wavy curves all fall within the scope of curves in accordance with the invention.

The inlay card of the present invention preferably comprises a major surface and/or a first minor surface adjoined to said major surface along a first bending line and/or a second minor surface disjoint from said first minor surface and adjoined to said major surface along a second bending line. This configuration is advantageous in that the inherent, respective linearity of the first and second bending lines, together with the mutual disjointedness of the first and second minor surfaces, allows the inlay card to be bent along the bending lines without undesirably creasing, warping or otherwise deforming the inlay card. In this respect, each of the first and second minor surfaces can be understood as a tab adjoined to the major surface.

The second bending line is preferably contiguous to the first bending line. This feature allows the path of the first and second bending lines to approximate the path of a continuous function, e.g. a curve or a plurality of lines arranged such that each endpoint of said lines, excepting the two outermost endpoints of said lines, touches one and only one other endpoint of said lines, i.e. an endpoint belonging to an adjacent one of said lines. Conversely, a configuration in which the second bending line is not contiguous to the first bending line allows the path of the first and second bending lines to approximate the path of a discontinuous function, e.g. the path of a multifaceted wall having the shape of a square wave.

Preferably, said first bending line and said second bending line are configured and adapted for reception by said intersection curve. In other words, the first and second bending lines are preferably configured at an angle to one another such that they approximate a region of the intersection curve. In this respect, the person skilled in the art of linear approximation of curves is familiar with numerous techniques and can readily select, upon knowledge of the teachings of the present specification, those techniques applicable to this aspect of the invention without applying inventive effort. This preferred feature of the invention, particularly in conjunction with the aforementioned mutual disjointedness of the first and second minor surfaces, allows the inlay card to (essentially) abut the respective region of the intersection curve as well as respective regions of said (curved) wall of the enclosure without undesirably creasing, warping or otherwise deforming the inlay card.

Preferably, the major surface of the inlay card is configured and adapted for reception by the enclosure major surface. Similarly, the first and second minor surfaces are preferably configured and adapted such that, when the major surface is received by the enclosure major surface, the first and second minor surfaces are received by the (curved) wall of the enclosure. In accordance with these preferred features of the invention, the major surface and/or the minor surfaces may be of comparable size and shape to the enclosure major surface/the (curved) wall, respectively, to be fittingly assembled thereonto. For example, the total surface area of the curved wall will preferably match the total surface area of the minor surfaces associated therewith.

Figure 3:
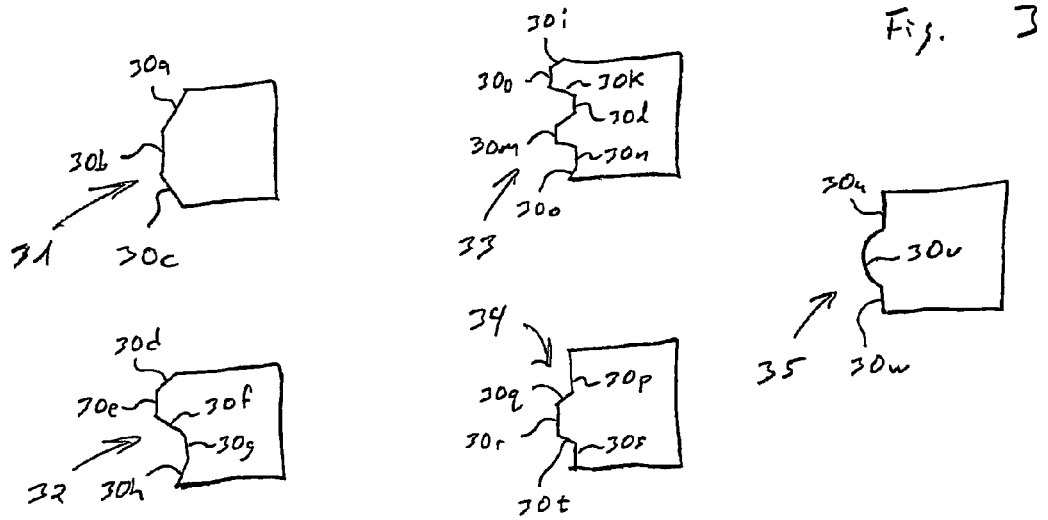
FIG. 3 a cross-sectional view of multifaceted side faces of an enclosure in accordance with the invention.

The inlay card of the present invention is preferably configured and adapted for decorating an enclosure having an enclosure major surface and at least one multifaceted wall comprising, as facets thereof, at least a first and second wall that respectively, linearly intersect said enclosure major surface along an intersection. Such enclosures include jewel cases having a multifaceted side face. In this case, the first and second walls can correspond to neighboring facets of the multifaceted side face of the jewel case. Preferably, the first and second walls intersect each other, in particular at an angle other than 90°. Former is the case e.g. for multifaceted walls not having a curved wall between the first and second wall; latter is the case e.g. for multifaceted walls not having the shape of a square wave. Although the term "multifaceted wall" is preferably to be understood in the sense of a wall having a plurality of solely planar facets, the features and techniques of the present invention can be applied to enclosures having one or more curved facets, in particular to sheet-like facets that intersect the enclosure major surface along an intersection curve. Similarly, the features and techniques of the present invention can be applied to enclosures having a mixture of multifaceted and curved walls. In the case of non-planar facets or a mixture of curved and multifaceted walls, the teachings re curved walls and intersection curves apply mutatis mutandis. Accordingly, multifaceted, left side faces 31, 32, 33 and 34 as well as, in particular, the omega-shaped, left side face 35 of the generally rectangular enclosures shown in the cross-sectional view of FIG. 3 and their respective facets 30*a*-30*w* reflect multifaceted/multifaceted and curved walls in accordance with the invention.

Preferably, said first bending line and said second bending line are configured and adapted for reception by said intersection. In other words, the first and second bending lines are preferably configured at an angle to one another such that they match respective regions of the intersection. In the case where the second bending line is contiguous to the first bending line, the first and second bending lines are preferably configured at an angle to one another such that they match a region of the intersection where said first and second walls jointly intersect said enclosure major surface. This preferred feature of the invention, particularly in conjunction with the aforementioned mutual disjointedness of the first and second minor surfaces, allows the inlay card to abut the respective region(s) of the intersection as well as respective regions of the first and second walls of the enclosure without undesirably creasing, warping or otherwise deforming the inlay card.

As discussed above, the major surface of the inlay card is configured and adapted for reception by the enclosure major surface. Similarly, the first and second minor surfaces are preferably configured and adapted such that, when the major surface is received by the enclosure major surface, the first and second minor surfaces are received by the first and second walls of the enclosure. In accordance with these preferred features of the invention, the major surface and/or the first and second minor surfaces may be of comparable size and shape to the enclosure major surface/the first and second walls, respectively, to be fittingly assembled thereonto. For example, the total surface area of the multifaceted wall will preferably match the total surface area of the minor surfaces associated therewith.

Naturally, the inlay card of the present invention may analogously comprise further minor surfaces that are each adjoined to the major surface along a respective bending line and that are each disjoint from the other minor surfaces of the inlay card. In this manner, the bending lines can "follow" even a highly non-linear intersection curve or the intersection of a multifaceted wall with the enclosure major surface without undesirably creasing, warping or otherwise deforming the inlay card. Similarly, the minor surfaces can conform to a multifaceted or strongly curved wall without deforming the inlay card.

For the reasons discussed above, the bending line of any of the minor surfaces of the inlay card may be contiguous, per side, to not more than one bending line associated with an adjacent other of the minor surfaces.

Preferably, the inlay card is formed from a single piece of material. This promotes simple, cost-effective manufacture of the inlay card. For example, it allows for a plurality of identically shaped inlay cards to be simultaneously cut or stamped from a stack of material any single step. Moreover, this feature promotes simple, 1-sided or two-sided printing of the inlay card. This feature also contributes to proper registration of images on the respective surfaces of the inlay card, in particular on the minor surfaces when these have been realigned via bending.

In cases where a single piece of material cannot be cut so as to yield the desired, e.g. major and minor, surfaces or in cases where employment of various materials is desired, for example, any of the minor surfaces and/or other elements of the inlay card may be adjoined to the major surface as known in the art of fastening. Former case could arise in the case of a strongly curved convex wall, i.e. a wall that lies between its center of curvature and the enclosure major surface.

Preferably, the bending lines comprise weakened areas, preferably perforations, in said material. Moreover, weakened areas may pre-exist in the stock material from which the card is formed, i.e. bending lines may already exist e.g. in a roll of card and may have been put in during paper manufacture. Alternatively, the bending lines may be added to the sheet material later, or each inlay card may be cut to shape, and the bending lines added to each inlay card individually.

The presence of weakened areas promotes bending of the inlay card at the appropriate locations, i.e. along the bending lines, e.g. as the inlay card is automatically press-fitted into a jewel case. This promotes reliable, automated assembly of the inlay card into the enclosure, especially via conventional inlay card processing machines, since e.g. a press-fitting force applied solely to the major surface is sufficient to effect a bending of the inlay card along the bending lines such that the first and second minor surfaces can be abuttingly received by (a) respective wall(s) of the enclosure. Although it is possible to effect appropriate bending of the inlay card along the bending lines during assembly of the inlay card into the enclosure without first forming such weakened areas, this has been found to yield a less cost-effective overall manufacturing and assembly process.

The action of press-fitting the inlay card within the jewel case may be combined with the action of fitting the disc inlay tray or disc cartridge into the jewel case. In this way, the inlay card may be quickly and accurately seated in the enclosure, flush with the surfaces of the respective walls of the enclosure and sandwiched between the enclosure and the disc inlay tray or disc cartridge.

Preferably, the bending lines comprise perforations at a ratio of or on the order of 1:2 material to cut. As touched upon above, the amount to which the bending lines are weakened prior to assembly of the inlay card into the enclosure has been found to have significant impact on the reliability and consequently on the cost-effectiveness of the assembly process. A perforation ratio of 1:2 material to cut has been found to be especially useful for obtaining reliable assembly of inlay cards made of a single piece of paper having a weight of 170 grams per square meter into jewel cases having a slightly rounded side face by means of conventional inlay card processing machines has employed for assembling conventional inlay cards into conventional, rectangular jewel cases.

For the reasons discussed above, a preferred embodiment of the invention provides packaging for a disk-shaped medium, comprising an inlay card in accordance with any of the embodiments described above or hereinbelow as well as a jewel case configured as said enclosure.

The disk-shaped medium may be a conventional CD or a data carrier mounted within a cartridge or cassette, for example a MiniDisc™, a UMD™, or a Blu-Ray Disc™.

As touch upon above, a broadest aspect of the invention provides a method for manufacturing an inlay card for decorating an enclosure. Analogous to the statements above, the enclosure preferably has an enclosure major surface and at least one wall intersecting said enclosure major surface along an intersection curve, and the method preferably comprises one or both of the steps of forming a first minor surface adjoined to a major surface along a first bending line, and forming a second minor surface disjoint from said first minor surface and adjoined to said major surface along a second bending line that is contiguous to said first bending line.

Similarly, the enclosure preferably has an enclosure major surface and at least one multifaceted wall comprising, as facets thereof, a first wall and a second wall that intersect said enclosure major surface along an intersection, and the method preferably comprises one or both of the steps of forming a first minor surface adjoined to a major surface along a first bending line and forming a second minor surface disjoint from said first minor surface and adjoined to said major surface along a second bending line, wherein the first and second bending lines are formed for reception by said intersection. Preferably, the first and second walls intersect each other at an angle other than 90° and the second bending line is formed contiguous to the first bending line.

Preferably, the step of forming a second minor surface disjoint from the first minor surface comprises the step of cutting any material directly joining the first minor surface and the second minor surface. This feature is advantageous is that a step of cutting is simple to automate. In particular, such cutting can be effected with regard to several inlay cards simultaneously.

Preferably, the method comprises the step of printing an image on said first minor surface, said second minor surface and said major surface prior e.g. to formation thereof. This, too, simplifies automated and/or batch processing of the inlay card. Moreover, it can contribute to proper registration of the images on the respective surfaces of the inlay card, in particular on the minor surfaces when these have been realigned via bending.

Any images on the minor surfaces are preferably designed such that overlap, e.g. when the inlay card in assembled into the enclosure, and/or cuts between the respective minor surfaces are visually obscured, e.g. via appropriate choice of color, shape and/or positioning of any images (which may include text) thereon.

Moreover, any cuts and/or overlap between respective minor surfaces is preferably located such that any image, e.g. title, artist and catalog number of a CD, on the curved/multi-faceted wall of the enclosure can be seen from both sides when the enclosure is shelved.

To decrease the risk of the disjoint minor surfaces being perceived, e.g. when assembled into an enclosure, as unaesthetically separate, it is preferably to limit the number of minor surfaces to three. In some cases, however, e.g. in the case of a tight radius, it may be appropriate to employ four, five, six or even more minor surfaces per curved wall. In the case of a multifaceted wall, aesthetics will typically dictate the use of as many minor surfaces as the respective wall has (planar) facets.

Preferably, any steps for forming the inlay card, in particular for forming the major surface and/or any of the minor surfaces, may comprise stamping the inlay card from a sheet of material, e.g. together with a plurality of further such inlay cards from a stack of sheets of said material. This feature also simplifies automated and/or batch processing of the inlay card.

Preferably, the method of the invention comprises assembling the inlay card into or onto the enclosure by automated means, in particular by applying a force to the major surface such that the major surface is received by the enclosure major surface and the inlay card is bent at the bending lines via contact of the inlay card with enclosure such that the first and second minor surfaces are received by said one wall/said first and second walls of the enclosure. This feature significantly eases automation of the assembly process, i.e. allows assembly by means of existing inlay card processing machines with little or no modification thereof.

Numerous preferred methods of the present invention, e.g. as reflected in the annexed claims, will be readily evident and/or self-explanatory to the reader from the above description of the preferred inlay card of the invention and are consequently not described here in redundant detail.

Figure 4:
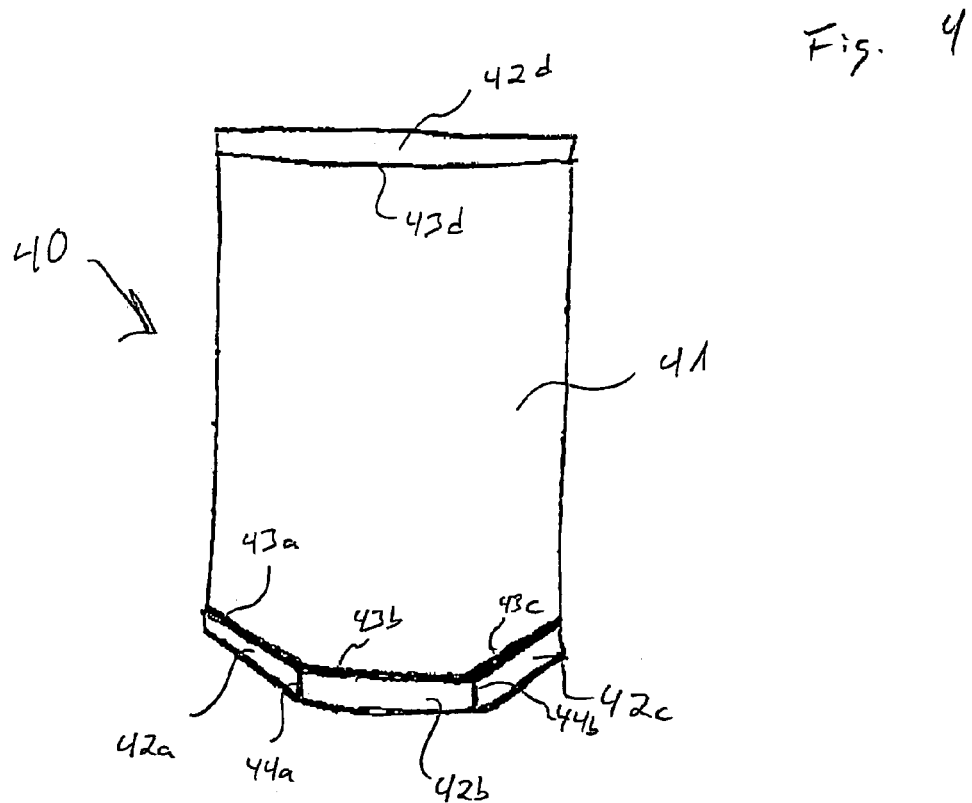
FIG. 4 a first inlay card in accordance with the invention.

FIG. 4 shows an exemplary inlay card 40 in accordance with the invention. Inlay card 40 comprises a major surface 41, a first minor surface 42a and a second minor surface 42b. It is also shown as comprising a third minor surface 42c, e.g. for reception by a curved wall of an enclosure together with first and second minor surfaces 42a and 42b, as well as a fourth minor surface 42d, e.g. for reception by a wall of the enclosure opposite the curved wall. Each of minor surfaces 42a-42d is adjoined to the major surface 41 along a respective, perforated bending line 43a-43d. First and second minor surfaces 42a and 42b are disjoined from one another via cut 44a that extends from an edge of the inlay card 40 to an intersection of bending lines 43a and 43b. Second and third minor surfaces 42b and 42c are disjoined from one another via cut 44b that extends from an edge of the inlay card 40 to an intersection of bending lines 43b and 43c.

FIG. 5 shows an further exemplary inlay card 50 in accordance with the invention. Inlay card 50 comprises a major surface 51, a first minor surface 52a and a second minor surface 52b. It is also shown as comprising a third minor surface 52c, e.g. for reception by a curved wall of an enclosure together with first and second minor surfaces 52a and 52b, as well as a fourth minor surface 52d, e.g. for reception by a wall of the enclosure opposite the curved wall.

Each of minor surfaces 52a-52d is adorned with a text image for viewing through transparent walls of an enclosing jewel case and is adjoined to the major surface 51 along a respective, perforated bending line 53a-53d. First and second minor surfaces 52a and 52b are disjoined from one another via cut 54a that extends from an edge of the inlay card 50 to an intersection of bending lines 53a and 53b. Second and third minor surfaces 52b and 52c are disjoined from one another via cut 54b that extends from an edge of the inlay card 50 to an intersection of bending lines 53b and 53c. Preferred dimensions of the elements of the inlay card 50 are reflected in the Figure.

FIGS. 6A to 6D shows an exemplary enclosure in accordance with the invention in the form of a dual disc jewel case 60.

FIG. 6A shows a top view of the dual disc jewel case 60. FIG. 6B shows a cross-section of the dual disc jewel case 60 of FIG. 6A; FIG. 6C shows a side view of the dual disc jewel case 60 of FIG. 6A; and FIG. 6D shows an exploded view of the dual disc jewel case 60 of FIG. 6A together with a disc 69.

The dual disc jewel case comprises a base 61, a disc tray 62 for receiving and supporting disc 69 as well as a cover 63. Base 61 is formed of a transparent plastic and comprises, in addition to walls not designated, a major surface 64, a curved side wall 65 and an opposite, planar side wall 66. Base 61, in particular major surface 64, curved side wall 65 and opposite side wall 66, is configured and adapted to receive an inlay card as generally known in the art prior to assembly of disc tray 62 into base 61.

Further information with regard to the terminology used in this specification as well as techniques and hardware employable for implementing the known features of the invention can be found in the documents cited in the bibliography at the end of this specification, the contents of which are incorporated herein by reference.

While the preferred and alternative embodiments of the present invention have been disclosed and described in detail herein, it will be apparent to those skilled in the art that various changes may be made to the configuration, operation and form of the invention without departing from the spirit and scope thereof. In particular, it is noted that the respective features of the invention, even those disclosed solely in combination with other features of the invention, may be combined in any configuration excepting those readily apparent to the person skilled in the art as nonsensical. Likewise, use of the singular and plural is solely indicative of a preference and is not to be interpreted as limiting. Except where the contrary is explicitly noted, the plural may be replaced by the singular and vice-versa.

BIBLIOGRAPHY

US2003038050
US2004118716
US2003173239
WO03008185
US2003094388
U.S. Pat. No. 6,155,026

The invention claimed is:

1. An inlay card for decorating an enclosure having an enclosure major surface and at least one wall intersecting said enclosure major surface along an intersection curve, comprising:
    a major surface having at least two sides intersecting each other at a 90° angle;
    a first minor surface adjoined to said major surface along a first straight bending line; and
    a second minor surface disjoint from said first minor surface and adjoined to said major surface along a second straight bending line that is contiguous to said first straight bending line, and said first straight bending line and said second straight bending line intersecting each other at an angle other than 90°,
    wherein said first straight bending line and said second straight bending line are received by said intersection curve when said inlay card is placed into said enclosure, and
    wherein said major surface is received by said enclosure major surface and said first and second minor surfaces are received by said wall.

2. An inlay card for decorating an enclosure having an enclosure major surface and at least one multifaceted wall comprising, as facets thereof, at least a first and second wall that respectively, linearly intersect said enclosure major surface along an intersection, comprising:
    a major surface having at least two sides intersecting each other at a 90° angle;
    a first minor surface adjoined to said major surface along a first bending line; and
    a second minor surface disjoint from said first minor surface and adjoined to said major surface along a second bending line that is contiguous to said first bending line, and said first bending line and said second bending line intersecting each other at an angle other than 90°,
    wherein said angle other than 90° is chosen such that said first bending line and said second bending line match respective regions of said intersection when said inlay card is placed into said enclosure, and wherein said major surface is received by said enclosure major surface and said first and second minor surfaces are received by said first and second walls of said at least one multifaceted wall.

3. The inlay card of claim 2, wherein said first and second walls intersect each other at an angle other than 90°, and said second bending line is contiguous to said first bending line.

4. The inlay card of claim 2, wherein said inlay card is formed from a single piece of material and said bending lines comprise weakened areas, preferably perforations, in said material.

5. The inlay card of claim 4, wherein said bending lines comprise perforations at a ratio of 1:2 material to cut.

6. Packaging for a disk-shaped medium, comprising:
an inlay card in accordance with claim 5; and
a jewel case configured as said enclosure.

7. A method for manufacturing an inlay card for decorating an enclosure and the enclosure, comprising the steps of:
forming the enclosure having an enclosure major surface and at least one wall intersecting said enclosure major surface along an intersection curve;
forming a first minor surface adjoined to a major surface along a first bending line, the major surface having at least two sides intersecting each other at a 90° angle;
forming a second minor surface disjoint from said first minor surface and adjoined to said major surface along a second bending line that is contiguous to said first bending line, and said first bending line and said second bending line intersecting each other at an angle other than 90°, said angle other than 90° being chosen such that said first bending line and said second bending line match respective regions of said intersection curve when said inlay card is placed into said enclosure; and
inserting said inlay card into the enclosure such that said major surface is received by said enclosure major surface and said first and second minor surfaces are received by said wall.

8. The method in accordance with claim 7, wherein said steps of forming said first and second minor surfaces adjoined to said major surface respectively comprise the step of weakening, preferably perforating, as said bending lines, areas of a single piece of material constituting said inlay card.

9. The method in accordance with claim 8, wherein said weakening comprises perforating said inlay card at a ratio of 1:2 material to cut.

10. The method in accordance with claim 7, wherein said step of forming a second minor surface disjoint from said first minor surface comprises the step of cutting any material directly joining said first minor surface and said second minor surface.

11. The method in accordance with claim 7, comprising the prior step of printing an image on said first minor surface, said second minor surface and said major surface.

12. The method in accordance with claim 7, wherein said forming steps comprise stamping said inlay card, together with a plurality of further such inlay cards, from a sheet of material from a stack of sheets of said material.

13. A method for manufacturing an inlay card for decorating an enclosure and the enclosure, comprising the steps of:
forming the enclosure having an enclosure major surface and at least one multifaceted wall comprising, as facets thereof, a first wall and a second wall that intersect said enclosure major surface along an intersection;
forming a first minor surface adjoined to a major surface along a first bending line, the major surface having at least two sides intersecting each other at a 90° angle; and
forming a second minor surface disjoint from said first minor surface and adjoined to said major surface along a second bending line that is contiguous to said first bending line, said first bending line and said second bending line intersecting each other at an angle other than 90°, said angle other than 90° being chosen such that said first bending line and said second bending line match respective regions of said intersection when said inlay card is placed into said enclosure; and
inserting said inlay card into the enclosure such that said major surface is received by said enclosure major surface and said first and second minor surfaces are received by said first and second walls of said at least one multifaceted wall.

14. The method in accordance with claim 13, wherein said first and second walls intersect each other at an angle other than 90°, and said second bending line is formed contiguous to said first bending line.

15. The method in accordance with claim 13, wherein said steps of forming said first and second minor surfaces adjoined to said major surface respectively comprise the step of weakening, preferably perforating, as said bending lines, areas of a single piece of material constituting said inlay card.

16. The method in accordance with claim 15, wherein said weakening comprises perforating said inlay card at a ratio of 1:2 material to cut.

17. The method in accordance with claim 13, wherein said step of forming a second minor surface disjoint from said first minor surface comprises the step of cutting any material directly joining said first minor surface and said second minor surface.

18. The method in accordance with claim 13, wherein said forming steps comprise stamping said inlay card, together with a plurality of further such inlay cards, from a sheet of material from a stack of sheets of said material.

19. A method for packaging a disk-shaped medium, comprising:
forming a first minor surface adjoined to a major surface along a first bending line;
forming a second minor surface disjoint from said first minor surface and adjoined to said major surface along a second bending line that is contiguous to said first bending line, and said first bending line and said second bending line intersecting each other at an angle other than 90° such that when said inlay card is placed into an enclosure having an enclosure major surface and at least one wall intersecting said enclosure major surface along an intersection curve, said first bending line and said second bending line are received by said intersection curve, said major surface being received by said enclosure major surface and said first and second minor surfaces being received by said wall; and
inserting said inlay card into a jewel case configured as said enclosure.

20. The method in accordance with claim 19, wherein said inserting is effected by automated means.

21. The method in accordance with claim 19, wherein said step of inserting comprises the step of applying a force to said major surface such that said major surface is received by said enclosure major surface and said inlay card is bent at said bending lines via contact of said inlay card with said jewel case such that said first and second minor surfaces are received by said at least one wall of said jewel case.

* * * * *